United States Patent
Xia et al.

(10) Patent No.: US 11,528,693 B2
(45) Date of Patent: Dec. 13, 2022

(54) METHOD FOR MONITORING DOWNLINK CONTROL CHANNEL AND RELATED APPARATUS

(71) Applicant: Huawei Technologies Co., Ltd., Shenzhen (CN)

(72) Inventors: Jinhuan Xia, Beijing (CN); Yongxia Lyu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 16/875,445

(22) Filed: May 15, 2020

(65) Prior Publication Data

US 2020/0280972 A1    Sep. 3, 2020

Related U.S. Application Data

(63) Continuation of application No. PCT/CN2018/116160, filed on Nov. 19, 2018.

(30) Foreign Application Priority Data

Nov. 17, 2017    (CN) .......................... 201711146376.3

(51) Int. Cl.
*H04W 4/00* (2018.01)
*H04W 72/04* (2009.01)
(Continued)

(52) U.S. Cl.
CPC ......... *H04W 72/042* (2013.01); *H04W 72/10* (2013.01); *H04W 72/1289* (2013.01); *H04W 76/19* (2018.02)

(58) Field of Classification Search
None
See application file for complete search history.

(56) References Cited

U.S. PATENT DOCUMENTS 9,584,283 B2    2/2017 Park et al.
10,554,363 B2 *    2/2020 Wang .................... H04L 5/0053
(Continued)

FOREIGN PATENT DOCUMENTS

CN    101932024 A    12/2010
CN    103650447 A    3/2014
(Continued)

OTHER PUBLICATIONS

"On PDCCH Candidate Priority Rules," Agenda item: 7.1.3.1.2, Source: Spreadtrum Communications, Document for Discussion and Decision, 3GPP TSG RAN WG1 Meeting #92bis, R1-1804214, Sanya, China, Apr. 16-20, 2018, 2 pages.

*Primary Examiner* — Bob A Phunkulh
(74) *Attorney, Agent, or Firm* — Slater Matsil, LLP

(57) ABSTRACT

A method and an apparatus for monitoring a downlink control channel, a terminal device, and a computer readable storage medium. The monitoring method includes determining, by a terminal device, priority information, where the priority information includes at least one of a control resource set priority, a search space priority, a downlink control information priority, or a downlink control information size priority, monitoring, by the terminal device, a downlink control channel based on the priority information, and obtaining, by the terminal device, downlink control information from the downlink control channel.

18 Claims, 5 Drawing Sheets

(51) Int. Cl.
  *H04W 76/19*  (2018.01)
  *H04W 72/10*  (2009.01)
  *H04W 72/12*  (2009.01)

(56) References Cited

U.S. PATENT DOCUMENTS

| | | | |
|---|---|---|---|
| 11,191,011 B2* | 11/2021 | Tiirola | H04L 5/0053 |
| 2012/0236814 A1* | 9/2012 | Nishio | H04L 5/0035 |
| | | | 370/329 |
| 2014/0133427 A1* | 5/2014 | Kim | H04L 5/0094 |
| | | | 370/329 |
| 2015/0208392 A1* | 7/2015 | Park | H04B 7/024 |
| | | | 370/329 |
| 2015/0264665 A1 | 9/2015 | Vos et al. | |
| 2015/0296542 A1* | 10/2015 | Heo | H04W 74/0833 |
| | | | 370/329 |
| 2015/0382379 A1* | 12/2015 | Kim | H04W 74/006 |
| | | | 370/329 |
| 2016/0219557 A1* | 7/2016 | He | H04W 76/28 |
| 2017/0013565 A1* | 1/2017 | Pelletier | H04W 52/365 |
| 2017/0086149 A1* | 3/2017 | Takeda | H04W 52/365 |
| 2018/0317254 A1* | 11/2018 | Hu | H04W 72/14 |
| 2018/0338307 A1* | 11/2018 | Feng | H04W 72/10 |
| 2019/0007959 A1* | 1/2019 | Hwang | H04W 72/0446 |
| 2019/0053270 A1* | 2/2019 | Akoum | H04L 5/0044 |
| 2019/0150073 A1* | 5/2019 | Tiirola | H04W 72/042 |
| | | | 455/434 |
| 2019/0207796 A1* | 7/2019 | Hwang | H04L 1/18 |
| 2020/0128578 A1* | 4/2020 | Park | H04L 5/00 |
| 2020/0145079 A1* | 5/2020 | Marinier | H04B 7/0456 |
| 2020/0169990 A1* | 5/2020 | Takeda | H04W 52/367 |
| 2020/0274678 A1* | 8/2020 | Lin | H04W 72/10 |

FOREIGN PATENT DOCUMENTS

| | | |
|---|---|---|
| CN | 101699901 A | 4/2014 |
| CN | 104469804 A | 3/2015 |
| CN | 104584460 A | 4/2015 |
| CN | 104662827 A | 5/2015 |
| CN | 109474384 A | 3/2019 |
| EP | 2732593 A2 | 5/2014 |
| EP | 3120644 A1 | 1/2017 |
| EP | 3487110 A1 | 5/2019 |

* cited by examiner

Network device 110

Terminal device 120

METHOD FOR MONITORING DOWNLINK CONTROL CHANNEL AND RELATED APPARATUS

CROSS-REFERENCE TO RELATED APPLICATIONS

This application is a continuation of International Application No. PCT/CN2018/116160, filed on Nov. 19, 2018, which claims priority to Chinese Patent Application No. 201711146376.3, filed on Nov. 17, 2017. The disclosures of the aforementioned applications are hereby incorporated by reference in their entireties.

TECHNICAL FIELD

This application relates to the communications field, and more specifically, to a method and an apparatus for monitoring a downlink control channel, a computer readable storage medium, and a terminal device.

BACKGROUND

A downlink control channel such as a physical downlink control channel (PDCCH) is used as a core of system resource allocation and control information scheduling. A receiving speed of the downlink control channel has important impact on a reaction speed of a communications system.

The downlink control channel carries downlink control information (DCI) of one or more terminal devices. For example, a terminal device receives downlink scheduling allocation information required for demodulation, decoding, and the like after receiving a physical downlink shared channel (PDSCH). The downlink scheduling allocation information is used to notify the terminal device of scheduling grant information, such as a resource and a transmission format, that needs to be used during physical uplink shared channel (PUSCH) transmission, acknowledgment information of shared channel transmission, and control information such as transmit power control signaling used for power control of an uplink physical channel.

There are a plurality of formats for DCI. DCI in different formats carries different information and has different functions. For example, a DCI format 0 is corresponding to PUSCH scheduling information, DCI formats 1, 1A, 1B, 1C, and 1D are corresponding to PDSCH scheduling information, DCI formats 1 and 2A are corresponding to some configuration information for a multi-antenna scenario, and a DCI format 3/3A is corresponding to some configuration information for uplink power control.

Usually, a terminal device does not know a format of DCI transmitted on a current downlink control channel, and does not know a location of information required by the terminal device, either. However, the terminal device knows information currently required by the terminal device.

For example, in an idle state, the terminal device expects paging information and system information. After initiating a random access preamble, the terminal device expects random access response information. When uplink data is to be sent, the terminal device expects uplink grant information and the like.

The terminal device may first decode different expected information, descramble a cyclic redundancy check (CRC) code by using a corresponding radio network temporary identifier (RNTI), and perform CRC check. If the check succeeds, the terminal device knows that the information is required by the terminal device, and also knows a corresponding DCI format, so that DCI content can further be decoded. This process may be referred to as a blind detection process of a downlink control channel.

A control channel element (CCE) is proposed in a communications system, to reduce a blind detection process of a downlink control channel. One CCE may include a plurality of resource element groups (REG).

One downlink control channel may include n consecutive CCEs, and the n CCEs may be referred to as a CCE set. The terminal device may monitor the downlink control channel on the CCEs.

A network device may configure one or more control resource sets (CORESET) for the terminal device. Each CORESET is associated with CCE-to-REG mapping. The terminal device may attempt to decode each downlink control channel on a CCE in a CORESET based on an expected DCI format. A set including candidate locations of a downlink control channel that needs to be monitored by the terminal device is defined as a search space of the downlink control channel. The search space may be understood as a CCE set on which monitoring needs to be performed and that is preset by the terminal device.

Assuming that the terminal device makes a blind detection attempt based on a given CCE aggregation level, a search space is a set including candidate locations of a downlink control channel in a CCE set defined based on the given aggregation level.

Usually, the network device configures a CORESET, an aggregation level, a quantity of candidate locations of a downlink control channel that are corresponding to each aggregation level, and a monitoring moment of a search space for the terminal device. In this way, the terminal device may monitor downlink control information based on these pieces of information. The terminal device may obtain, based on these pieces of information, a quantity of times the terminal device needs to attempt to decode the downlink control channel during monitoring.

However, a quantity of times the terminal device is capable of decoding the downlink control channel in a time period is limited. For example, the quantity of times is limited by a capability of the terminal device. Therefore, a method for monitoring a downlink control channel needs to be proposed to facilitate normal communication between a terminal device and a network device when a quantity of times the terminal device needs to attempt to decode a downlink control channel in a time period is greater than a maximum quantity of times the terminal is capable of decoding the downlink control channel in the corresponding time.

SUMMARY

This application provides a method for monitoring a downlink control channel and a related apparatus, to help ensure that a terminal device can detect a useful downlink control channel, thereby helping ensure normal communication between the terminal device and a network device.

According to a first aspect, this application provides a method for monitoring a downlink control channel. The monitoring method includes determining, by a terminal device, priority information, where the priority information includes at least one of the following: a control resource set priority, a search space priority, a downlink control information priority, or a downlink control information size priority, monitoring, by the terminal device, a downlink control channel based on the priority information, and obtaining, by the terminal device, downlink control information from the downlink control channel.

In the monitoring method, the terminal device may monitor the downlink control channel based on at least one of the following priorities: the control resource set priority, the search space priority, the downlink control information priority, or the downlink control information size priority, and obtain the downlink control information from the downlink control channel. This helps ensure that the terminal device preferentially monitors a useful downlink control channel, thereby helping ensure normal communication between the terminal device and a network device.

In a possible design, the control resource set priority includes a priority of a control resource set carrying first downlink control information is higher than that of a control resource set carrying second downlink control information, where the first downlink control information includes at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service, and the second downlink control information includes at least one of the following downlink control information: slot format indication information, discontinuous transmission indication information, or buffer flushing indication information.

In another possible design, the control resource set priority includes a priority of a control resource set carrying first downlink control information is higher than that of a control resource set carrying second downlink control information, where the first downlink control information is slot format indication information, and the second downlink control information includes at least one of the following downlink control information: discontinuous transmission indication information or buffer flushing indication information.

In another possible design, the control resource set priority includes a control resource set carrying first downlink control information has a highest priority, where the first downlink control information is scheduling information of a beam-failure-recovery-request response message.

In the first, second, or third implementation, a specific priority of a control resource set is provided, so that the terminal device may detect the downlink control channel based on the priority of the control resource set.

In another possible design, the search space priority includes a priority of a search space in which first downlink control information is located is higher than that of a search space in which second downlink control information is located, where the first downlink control information includes at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service, and the second downlink control information includes at least one of the following downlink control information: slot format indication information, discontinuous transmission indication information, or buffer flushing indication information.

In another possible design, the search space priority includes a priority of a search space in which first downlink control information is located is higher than that of a search space in which second downlink control information is located, where the first downlink control information is slot format indication information, and the second downlink control information includes at least one of the following downlink control information: discontinuous transmission indication information or buffer flushing indication information.

In another possible design, the search space priority includes a search space in which first downlink control information is located has a highest priority, where the first downlink control information is scheduling information of a beam-failure-recovery-request response message.

In this implementation, a specific priority of the search space is provided, so that the terminal device may detect the downlink control channel based on the priority of the search space.

In another possible design, the downlink control information priority includes a priority of first downlink control information is higher than that of second downlink control information, where the first downlink control information includes at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service, and the second downlink control information includes at least one of the following downlink control information: slot format indication information, discontinuous transmission indication information, or buffer flushing indication information.

In another possible design, the downlink control information priority includes a priority of first downlink control information is higher than that of second downlink control information, where the first downlink control information is slot format indication information, and the second downlink control information includes at least one of the following downlink control information: discontinuous transmission indication information or buffer flushing indication information.

In another possible design, the downlink control information priority includes first downlink control information has a highest priority, where the first downlink control information is scheduling information of a beam-failure-recovery-request response message.

In another possible design, the downlink control information size priority includes a priority of a downlink control information size of first downlink control information is higher than that of a downlink control information size of second downlink control information, where the first downlink control information includes at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service, and the second downlink control information includes at least one of the following downlink control information: slot format indication information, discontinuous transmission indication information, or buffer flushing indication information.

In another possible design, the downlink control information size priority includes a priority of a downlink control information size of first downlink control information is higher than that of a downlink control information size of second downlink control information, where the first downlink control information is slot format indication information, and the second downlink control information includes at least one of the following downlink control information: discontinuous transmission indication information or buffer flushing indication information.

In another possible design, the downlink control information size priority includes a downlink control information size of first downlink control information has a highest priority, where the first downlink control information is scheduling information of a beam-failure-recovery-request response message.

In another possible design, before the monitoring, by the terminal device, a downlink control channel based on the priority information, the monitoring method further includes determining, by the terminal device, that a quantity of times the terminal device needs to attempt to decode the downlink control channel in a first time period is greater than a quantity of times the terminal device is capable of decoding the downlink control channel in the first time period.

In other words, the terminal device monitors the downlink control channel based on the priority information only when the terminal device determines that the quantity of times the terminal device needs to attempt to decode the downlink control channel in the first time period is greater than the quantity of times the terminal device is capable of decoding the downlink control channel in the first time period. This can ensure that a downlink control channel with a higher priority can be preferentially detected when the quantity of times the terminal device needs to attempt to decode the downlink control channel in the first time period is greater than the quantity of times the terminal device is capable of decoding the downlink control channel in the first time period, thereby ensuring normal communication between a network device and the terminal device.

In another possible design, before the monitoring, by the terminal device, a downlink control channel based on the priority, the monitoring method further includes determining, by the terminal device, a first decoding quantity based on a first parameter and the quantity of times the terminal device needs to attempt to decode the downlink control channel in the first time period, where the first parameter is configured by a network device or is predefined, and determining, by the terminal device, that the first decoding quantity is greater than a quantity of times the terminal device is capable of decoding the downlink control channel in the first time period.

In other words, the terminal device determines the first decoding quantity based on the first parameter and the quantity of times the terminal device needs to attempt to decode the downlink control channel in the first time period, and then compares the first decoding quantity with the quantity of times the terminal device is capable of decoding the downlink control channel in the first time period, so that the terminal device has a greater opportunity to detect a downlink control channel with a lower priority.

In addition, the downlink control channel is monitored based on the priority information only when the first decoding quantity is greater than the quantity of times the terminal device is capable of decoding the downlink control channel in the first time period. This can ensure that a downlink control channel with a higher priority can be preferentially detected when the quantity of times the terminal device needs to attempt to decode the downlink control channel in the first time period is greater than the quantity of times the terminal device is capable of decoding the downlink control channel in the first time period, thereby ensuring normal communication between the network device and the terminal device.

In another possible design, the terminal device monitors a downlink control channel carrying a carrier indicator field, the terminal device monitors a downlink control channel carrying a bandwidth part BWP indicator field, or the terminal device monitors downlink control channels sent by a plurality of transmission reception points.

According to a second aspect, an embodiment of this application provides a downlink control channel monitoring apparatus, where the apparatus has a function of implementing behavior of the terminal device in the foregoing method designs. The function may be implemented by hardware, or may be implemented by hardware executing corresponding software. The hardware or the software includes one or more modules corresponding to the foregoing function, for example, a processor and a memory. The memory stores a related instruction, and the processor executes the instruction stored in the memory, to complete the processing steps in the foregoing method performed by the terminal device.

In a possible design, the monitoring apparatus includes a receiver, a processor, and a transmitter, and the receiver and the transmitter are configured to support communication between the terminal device and a network device. The processor is configured to determine priority information based on indication information received by the receiver, monitor downlink control information based on the priority information, and obtain the downlink control information from the downlink control channel. The network device may further include a memory. The memory is coupled to the processor, and the memory stores a program instruction and data that are necessary for the network device.

According to a third aspect, this application provides a computer readable storage medium. The computer readable storage medium stores program code executed by a terminal device. The program code includes an instruction that is used to perform the monitoring method in any one of the first aspect or the possible implementations of the first aspect.

According to a fourth aspect, this application provides a computer program product including an instruction. When the computer program product is run on a terminal device, the terminal device is enabled to perform the monitoring method in any one of the first aspect or the possible implementations of the first aspect.

According to a fifth aspect, this application provides a system chip. The system chip includes an input/output interface, at least one processor, at least one memory, and a bus. The at least one memory is configured to store an instruction, and the at least one processor is configured to invoke the instruction in the at least one memory, to perform the operations of the monitoring method in any one of the first aspect or the possible implementations of the first aspect.

According to a sixth aspect, this application provides a terminal device. The terminal device includes the monitoring device in the second aspect.

DETAILED DESCRIPTION OF ILLUSTRATIVE EMBODIMENTS

The following describes technical solutions in this application with reference to accompanying drawings.

Figure 1:
FIG. 1 is a schematic architectural diagram of a communications system to which a monitoring method according to an embodiment of this application is applied.

FIG. 1 is a schematic architectural diagram of a communications system to which a monitoring method according to an embodiment of this application is applied. It should be understood that embodiments of this application are not limited in the system architecture shown in FIG. 1. In addition, a device in FIG. 1 may be hardware, may be software obtained through function division, or may be a combination thereof.

The communications system shown in FIG. 1 may include a network device 110 and a terminal 120. It should be understood that, quantities of network devices 110 and terminal devices 120 are only examples in FIG. 1, and quantities of network devices and terminal devices in the communications system are not limited in this embodiment of this application.

For example, the network device 110 is a base station. It should be understood that a specific type of the base station is not limited in this embodiment of this application. In systems using different radio access technologies, names of devices having functions of the base station may be different. For ease of description, in all the embodiments of this application, all the foregoing apparatuses that provide a wireless communication function for the terminal are referred to as a base station.

The base station (BS) may also be referred to as a base station device, is a device that connects a terminal to a wireless network, and includes but is not limited to a transmission reception point (TRP), a NodeB in 5G (gNB), an evolved NodeB (evolved Node B, eNB), a radio network controller (radio network controller, RNC), a NodeB (node B, NB), a base station controller (BSC), a base transceiver station (base transceiver station, BTS), a home evolved NodeB (for example, a home evolved nodeB, or a home node B, HNB), a baseband unit (base band unit, BBU), a Wi-Fi access point (AP), or a pico base station device.

The terminal device may be user equipment (UE). The UE may communicate with one or more core networks (CN) by using a radio access network (RAN). The UE may be referred to as an access terminal, terminal device, a subscriber unit, a subscriber station, a mobile station, a mobile console, a remote station, a remote terminal, a mobile device, a user terminal, a radio network device, a user agent or a user apparatus. The UE may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, or a terminal device on an internet of things or on an internet of vehicles, a terminal device of any form in a future network, or the like.

Figure 2:
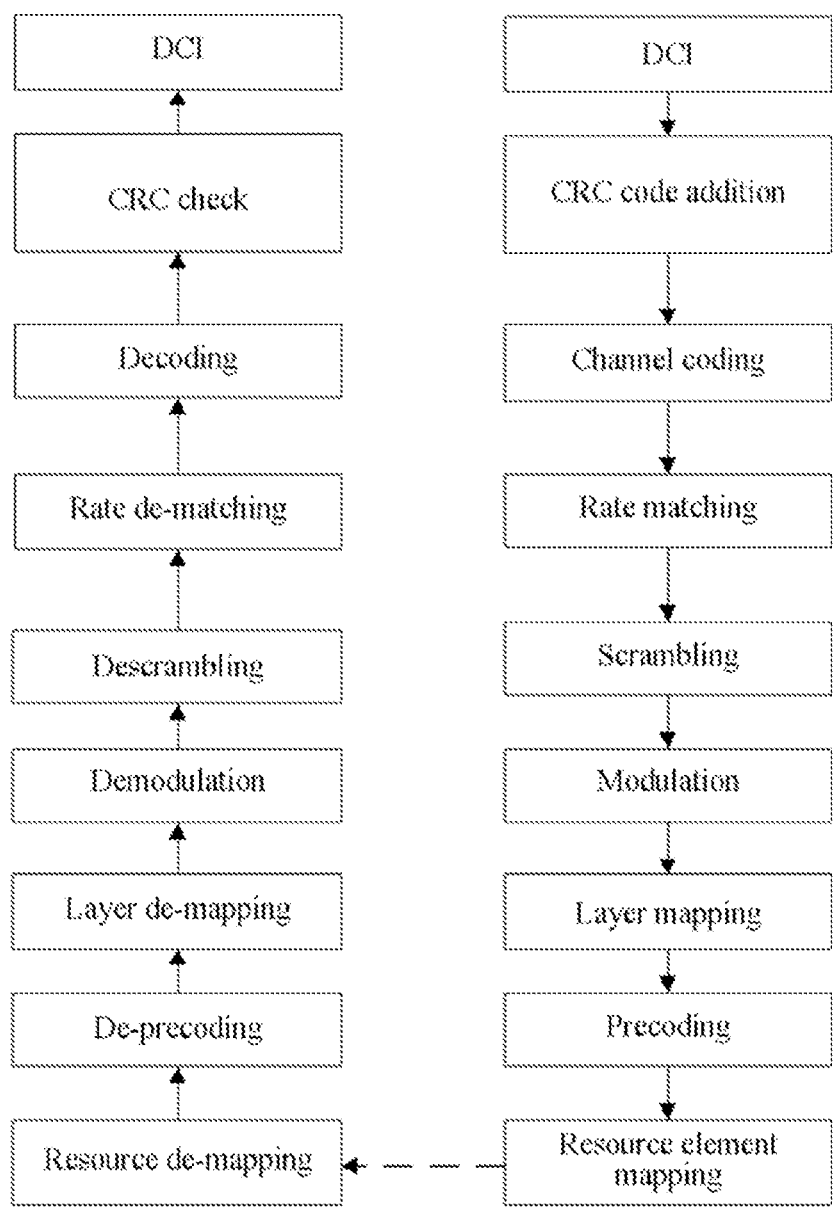
FIG. 2 is a schematic flowchart of a transmission process of a PDCCH.

With reference to FIG. 2, the following describes a transmission process of a downlink control channel in the prior art by using a PDCCH as an example.

As shown in FIG. 2, on a network device side used as a transmit end, CRC code addition, channel coding, and rate matching are separately performed on DCI to form a PDCCH, scrambling, modulation, layer mapping, and precoding are performed on the PDCCH, and finally resource element mapping and sending are performed in a CORESET.

A terminal device used as a receive end performs resource de-mapping, de-precoding, layer de-mapping, demodulation, and descrambling in the CORESET to obtain the PDCCH, and then may perform rate de-matching, decoding, and CRC check on the PDCCH, so as to obtain the DCI carried in the PDCCH.

The terminal device monitors all PDCCHs in the CORESET. The monitoring means attempting to decode a PDCCH in all locations that are in the CORESET and in which the PDCCH may be sent. If the CRC check is correct, it indicates that the terminal device correctly detects the PDCCH in a current location. Each location in which the PDCCH may be sent is corresponding to one or more CCEs, and is referred to as a candidate location of the PDCCH.

A CCE set that needs to be monitored by the terminal device may be described by using a search space. A search space of a PDCCH may be classified into a common search space (CSS), a group common search space (GC-SS), and a terminal device-specific search space (UE-specific search space, USS).

A common search space may carry downlink control information for scheduling common information. For example, the carried downlink control information is used to schedule system information, or is used to schedule a paging message, or is used to schedule a random access response message. All terminal devices need to monitor a PDCCH candidate set in a common search space. For a given terminal device, a common search space that needs to be monitored or a control resource set CORESET that carries the common search space is configured by a network device or is predefined.

A group common search space carries downlink control information that needs to be monitored by one or more UEs, for example, downlink control information used to indicate a slot configuration or downlink control information carrying discontinuous transmission indication information. For a given terminal device, a group common search space that needs to be monitored or a control resource set CORESET that carries the group common search space is configured by a network device or is predefined.

In a terminal device-specific search space, DCI that needs to be monitored by a terminal device is used to schedule the terminal device to receive downlink data, send uplink data, or the like. A CRC check code in the DCI is scrambled by using a cell radio network temporary identifier (C-RNTI). The terminal device knows only a C-RNTI of the terminal device. Therefore, the terminal device does not detect DCI scrambled by a C-RNTI of another device. For a given terminal device, a specific search space that needs to be monitored or a control resource set CORESET that carries the specific search space is configured by a network device or is predefined.

A terminal device may determine a search space by using a CORESET configured by a network device for the terminal device and a parameter related to the CORESET. The CORESET-related parameter used to determine the search space may include an aggregation level of the CORESET, a quantity of candidate locations of a downlink control channel that are corresponding to each aggregation level, and a monitoring moment of the search space. The quantity of candidate locations of the PDCCH included in the search space determines a quantity of times the terminal device needs to attempt to decode the PDCCH.

All search spaces of a CCE corresponding to candidate locations of a PDCCH may be obtained by using the following formula:

$$L \cdot \left\{ \left( Y_{p,k} + \left\lfloor \frac{m_{n_{CI}} \cdot N_{CCE,p}}{L \cdot M_{p,max}^{(L)}} \right\rfloor + n_{CI} \right) \mod \lfloor N_{CCE,p}/L \rfloor \right\} + i.$$

In the foregoing formula, $Y_{p,k} = (A_p \cdot Y_p) \mod D$, $Y_{p,-1} = n_{RNTI} \neq 0$, $A_0 = 39827$, $A_1 = 39829$, $D = 65537$, $i = 0, \ldots, L-1$, $N_{CCE,p}$ represents a quantity of CCEs in a CORESET p, and indexes of the CCEs range from 0 to $N_{CCE,p}-1$. If a PDCCH monitored by the terminal device when the terminal device is configured in a serving cell includes a carrier indicator field, $n_{CI}$ represents a value of the carrier indicator field (CIF), or otherwise, the value is 0. $M_{p,max}^{(L)}$ represents a quantity of candidate locations, corresponding to an aggregation level L in the CORESET, of PDCCHs that needs to be monitored by the terminal.

Usually, there is an upper limit for a quantity of times the terminal device can attempt to decode a PDCCH in a time period, and the quantity of times is limited by a capability of the terminal device. If a quantity of times the terminal device needs to attempt to decode a PDCCH in a time period exceeds a quantity of times the terminal device can attempt to decode the PDCCH in the time period, that is, exceeds a capability limit of the terminal device, the terminal device cannot attempt to decode the PDCCH in all search spaces.

Therefore, a new technical solution for monitoring a PDCCH needs to be proposed to help improve reliability of communication between a terminal device and a network device when a quantity of times the terminal device needs to attempt to decode a PDCCH exceeds a quantity of times the terminal device can attempt to decode the PDCCH in the time period.

Figure 3:
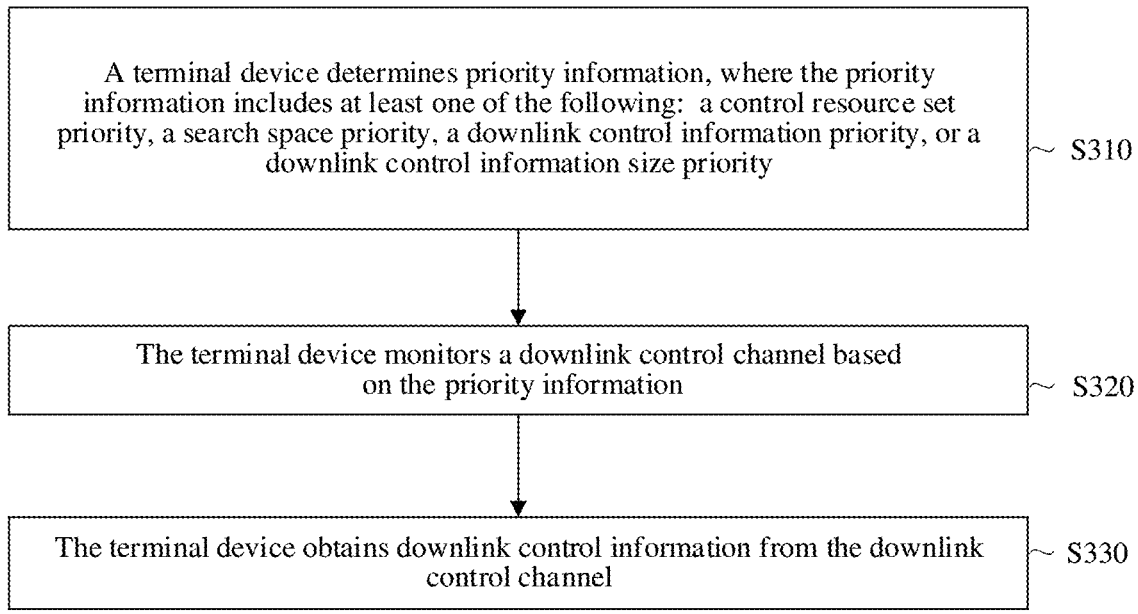
FIG. 3 is a schematic flowchart of a monitoring method according to an embodiment of this application.

FIG. 3 is a schematic flowchart of a method for monitoring a downlink control channel according to an embodiment of this application. It should be understood that FIG. 3 shows steps or operations of the monitoring method. However, these steps or operations are only examples. Other operations or variants of the operations in FIG. 3 may alternatively be performed in this embodiment of this application. The communication method shown in FIG. 3 includes S310, S320, and S330.

S310. A terminal device determines priority information, where the priority information includes at least one of the following: a control resource set priority, a search space priority, a downlink control information priority, or a downlink control information size priority.

For example, the terminal may store the priority information. The priority information may be preconfigured by the terminal device according to a communications protocol or a communications standard, or may be configured based on configuration information sent by a network device.

The downlink control information in this embodiment of this application includes at least one of the following downlink control information: scheduling information of uplink data, that is, downlink control information for scheduling sending of uplink data in an uplink cell, scheduling information of downlink data, that is, downlink control information for scheduling sending of downlink data in a cell, scheduling information of system information, that is, downlink control information for scheduling the system information, scheduling information of a random access response (RAR) message, that is, downlink control information for scheduling random access response information, scheduling information of a paging message, that is, downlink control information for scheduling the paging message, discontinuous transmission indication information, that is, downlink control information for indicating discontinuous transmission, slot format indication information, that is, downlink control information for indicating slot format information (SFI), scheduling information of a beam-failure-recovery-request response message, that is, downlink control information for scheduling the beam-failure-recovery-request response message, a transmit power control (TPC) command of a physical uplink shared channel, that is, downlink control information for indicating a PUSCH TPC command, a transmit power control command of a physical uplink control channel, that is, downlink control information for indicating a PUCCH TPC command, a transmit power control command of a sounding reference signal, that is, downlink control information for indicating a sounding reference signal (SRS) TPC command, scheduling information of a semi-persistent scheduling service, that is, downlink control information for indicating semi-persistent scheduling, or scheduling information of a grant-free service, that is, downlink control information for indicating grant-free scheduling transmission.

A CRC in the scheduling information of the system information may be scrambled by using a system information-radio network temporary identifier RNTI (SI-RNTI). In other words, if detecting DCI in which a CRC is scrambled by using an SI-RNTI, the terminal device may detect system information based on the DCI.

For example, a CRC in the scheduling information of the random access response message may be scrambled by using a random access-radio network temporary identifier (RA-RNTI). In other words, if detecting DCI in which a CRC is scrambled by using an RA-RNTI, the terminal device may detect a random access response message based on the DCI.

For example, a CRC in the scheduling information of the uplink data or the scheduling information of the downlink data may be scrambled by using a temporary cell-radio network temporary identifier (TC-RNTI). In other words, before the terminal device obtains a C-RNTI, if detecting DCI in which a CRC is scrambled by using a TC-RNTI, the terminal device may send uplink data or detect downlink data based on the DCI.

For example, a CRC in the scheduling information of the uplink data or the scheduling information of the downlink data may be scrambled by using a cell-radio network temporary identifier (C-RNTI). In other words, if detecting DCI in which a CRC is scrambled by using a C-RNTI, the terminal device may send uplink data or detect downlink data based on the DCI.

For example, a CRC in the PUSCH TPC command may be scrambled by using a transmit power control-physical uplink shared channel-radio network temporary identifier (transmission power control-physical uplink shared channel-radio network temporary identity, TPC-PUSCH-RNTI). In other words, if detecting DCI in which a CRC is scrambled by using a TPC-PUSCH-RNTI, the terminal device may adjust a transmit power of a PUSCH based on the DCI.

For example, a CRC in the PUCCH TPC command may be scrambled by using a transmit power control-physical uplink control channel-radio network temporary identifier (transmission power control-physical uplink control channel-radio network temporary identity, TPC-PUCCH-RNTI). In other words, if detecting DCI in which a CRC is scrambled by using a TPC-PUCCH-RNTI, the terminal device may adjust a transmit power of a PUCCH based on the DCI.

For example, a CRC in the SRS TPC command may be scrambled by using a transmit power control-sounding reference signal-radio network temporary identifier (transmission power control-sounding reference signal-radio network temporary identity, TPC-SRS-RNTI). In other words, if detecting DCI in which a CRC is scrambled by using a TPC-SRS-RNTI, the terminal device may adjust a transmit power of an SRS based on the DCI.

For example, a CRC in the scheduling information of the semi-persistent scheduling service may be scrambled by using a semi-persistent scheduling-cell radio network temporary identifier (SPS-RNTI). In other words, if detecting DCI in which a CRC is scrambled by using an SPS-RNTI, the terminal device may send uplink data of the semi-persistent scheduling service or detect downlink data of semi-persistent scheduling based on the DCI.

For example, the scheduling information of the grant-free service may be scrambled by using a grant-free-cell radio network temporary identifier (GF-RNTI). In other words, if detecting DCI in which a CRC is scrambled by using a GF-RNTI, the terminal device may send grant-free uplink data based on the DCI. The sending grant-free uplink data may include initial transmission of the grant-free uplink data and/or retransmission of the grant-free uplink data.

For example, a CRC in the slot format indication information may be scrambled by using slot format indication information-cell radio network temporary identifier (SFI-RNTI). In other words, if detecting DCI in which a CRC is scrambled by using an SFI-RNTI, the terminal device may obtain slot format information of a cell or a BWP based on the DCI.

For example, a CRC in the discontinuous transmission indication information may be scrambled by using an interrupted-cell radio network temporary identifier (interference-radio network temporary identity, INT-RNTI). In other words, if detecting DCI in which a CRC is scrambled by using an INT-RNTI, the terminal device may learn, based on the DCI, that no transmission for the terminal device is performed on a resource indicated by the DCI.

For example, a CRC in the buffer flushing indication information may be scrambled by using a buffer flushing indication-cell radio network temporary identifier (FI-RNTI). In other words, if detecting DCI in which a CRC is scrambled by using an FI-RNTI, the terminal device may clear data in a buffer based on the DCI.

For example, the scheduling information of the beam-failure-recovery-request response message may be scrambled by using a beam recovery-cell radio network temporary identifier (BR-RNTI). In other words, if detecting DCI in which a CRC is scrambled by using a BR-RNTI, the terminal device may detect a beam-failure-recovery-request response message based on the DCI.

It should be noted that, the foregoing RNTIs are only examples, and respectively represent downlink control information corresponding to functions. Downlink control information formats used for the downlink control information may be the same or different, quantities of bits carried in the downlink control information may be the same or different, the downlink control information may be carried in a same CORESET or different CORESETs, or the downlink control information may be carried in a same search space or different search spaces. Different search spaces include different candidate locations of a PDCCH at a same aggregation level or include different aggregation levels.

For example, the slot format information may indicate a downlink transmission resource, an uplink transmission resource, an indeterminate transmission resource, or a flexible transmission resource in one or more slots.

In the foregoing downlink control information, at least two types of downlink control information may use a same downlink control information format or have a same downlink control information size. When two types of downlink control information use a same downlink control information format or have a same downlink control information size, each type of downlink control information includes indication information used to indicate a type of the downlink control information, or different RNTIs are used during CRC scrambling to determine types of the downlink control information.

For example, the scheduling information of the uplink data and the scheduling information of the downlink data use different downlink control information formats and CRCs therein are all scrambled by using a TC-RNTI or a C-RNTI, but the scheduling information has a same downlink control information size, and each type of downlink control information includes 1 bit used to determine whether the detected downlink control information is the scheduling information of the uplink data or the scheduling information of the downlink data.

For another example, the scheduling information of the uplink data or the scheduling information of the downlink data and the slot format indication information use different downlink control information formats and also have a same downlink control information size, but a difference may be that A CRC in the downlink control information, that is, the scheduling information of the uplink data or the scheduling information of the downlink data, is scrambled by using a C-RNTI, and a CRC in the downlink control information, that is, the slot format indication information, is scrambled by using an SFI-RNTI, and the two types of downlink control information are carried in different control resource sets or different search spaces.

For another example, the slot format indication information and the discontinuous transmission indication information use different downlink control information formats, but CRCs in the downlink control information are respectively scrambled by using an SFI-RNTI and an INT-RNTI, and the two types of downlink control information have a same size, but the two types of downlink control information are carried in different control resource sets or different search spaces.

For another example, the discontinuous transmission indication information and the buffer flushing indication information use different downlink control information formats, but a CRC in the downlink control information, that is, the discontinuous transmission indication information, is scrambled by using an INI-RNTI, and a CRC in the downlink control information, that is, the buffer flushing indication information, is scrambled by using an FI-RNTI or a C-RNTI, and the two types of downlink control information have a same size, but the two types of downlink control information are carried in different control resource sets or different search spaces.

Optionally, at least two types of downlink control information may use different downlink control information formats or have different downlink control information sizes. For example, a downlink control information format of downlink control information for scheduling sending of a downlink data channel in a cell may be a downlink control information format 1, a downlink control information format of downlink control information for scheduling sending of at least one of system information, random access response information, and paging information may be a downlink control information format 2, a downlink control information format of downlink control information for indicating discontinuous transmission may be a downlink control information format 3, a downlink control information format of downlink control information for indicating slot format information may be a downlink control information format 4, and a downlink control information format of downlink control information for indicating a beam-failure-recovery-request response message may be a downlink control information format 5.

It can be learned from the foregoing content that, different downlink control information may be corresponding to different downlink control information formats. Therefore, a downlink control information priority may also be referred to as a downlink control information format priority.

S320. The terminal device monitors a downlink control channel based on the priority information.

For example, the terminal device may first monitor a downlink control channel sent by using a control resource set with a higher priority, and then monitor downlink control information sent by using a control resource set with a lower priority.

For another example, the terminal device may first monitor a downlink control channel in a search space with a higher priority, and then monitor a downlink control channel in a search space with a lower priority.

For still another example, the terminal device may first monitor a downlink control channel carrying downlink control information with a higher priority, and then monitor a downlink control channel carrying downlink control information with a lower priority.

For still another example, the terminal device may first monitor a downlink control channel carrying information whose size is equal to a downlink control information size with a higher priority, and then monitor a downlink control channel carrying information whose size is equal to a downlink control information size with a lower priority. This is because before the terminal device detects a downlink control channel, the terminal device knows which downlink control information needs to be obtained by the terminal device. Different downlink control information may carry different quantities of bits. If there is a padding bit, a quantity of the bits includes a useful information bit and a padding bit.

For example, when downlink control information with a higher priority carries 20 bits and downlink control information with a lower priority carries 30 bits, the terminal device first monitors the downlink control channel with 20 bits, and then monitors the downlink control channel with 30 bits.

Optionally, there may be a priority order among a control resource set, a search space, downlink control information, and a downlink control information size. For example, when a priority of a control resource set is higher than that of a search space, if the priority information not only includes a control resource set priority, but also includes a search space priority, the terminal device may first monitor a downlink control channel based on the control resource set priority, and then monitor a downlink control channel based on the search space priority.

For example, if a priority of a control resource set 1 is higher than that of a control resource set 2, the terminal device may first monitor a downlink control channel sent by using the control resource set 1. When the control resource set 1 includes a search space 1 and a search space 2 and a priority of the search space 1 is higher than that of the search space 2, the terminal device first monitors a downlink control channel in the search space 1, and then monitors a downlink control channel in the search space 2.

For example, when the priority information includes a control resource set priority and a downlink control information priority, or includes a downlink control information priority and a search space priority, or includes a control resource set priority, a downlink control information priority, and a search space priority, a method for monitoring a downlink control channel by the terminal device is similar, and details are not described again.

S330. The terminal device obtains downlink control information from the downlink control channel.

The obtaining, by the terminal device, downlink control information from the downlink control channel may include performing, by the terminal device, rate de-matching, decoding, and CRC check on the downlink control channel.

Because the terminal device has a capability of learning downlink control information that the terminal device needs to obtain, the terminal device may perform CRC check by using an RNTI corresponding to the downlink control information that needs to be obtained by the terminal device. If the check fails, it indicates that the downlink control information is not downlink control information that the terminal device expects to obtain.

For example, when the check succeeds, if CRCs in different downlink control information are scrambled by using a same RNTI, the terminal device may further determine, with reference to a control resource set and/or a search space and/or a size of downlink control information or a bit indication included in the downlink control information, a type of the downlink control information, that is, whether the downlink control information is downlink control information that the terminal device expects to obtain, otherwise, the terminal device may directly determine that the downlink control information is downlink control information that the terminal device expects to obtain.

In this embodiment of this application, optionally, the control resource set priority may include a priority of a control resource set carrying first downlink control information is higher than that of a control resource set carrying second downlink control information.

In this case, the terminal device may first monitor a downlink control channel sent by using the control resource set with a higher priority, and then monitor a downlink control channel sent by using the control resource set with a lower priority. Alternatively, the terminal device may first obtain the first downlink control information, and then obtain the second downlink control information.

For example, when the priority of the control resource set carrying the first downlink control information is higher than that of the control resource set carrying the second downlink control information, in a first possible implementation, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

For example, the second downlink control information may include at least one of the following downlink control information: slot format indication information, discontinuous transmission indication information, or buffer flushing indication information.

For example, when the priority of the control resource set carrying the first downlink control information is higher than that of the control resource set carrying the second downlink control information, in a second possible implementation, the first downlink control information may be slot format indication information, and the second downlink control information may include at least one of the following downlink control information: discontinuous transmission indication information or buffer flushing indication information.

In this embodiment of this application, optionally, the control resource set priority may include a control resource set carrying first downlink control information has a highest priority. The first downlink control information may be scheduling information of a beam-failure-recovery-request response message.

In this embodiment of this application, optionally, the search space priority may include a priority of a search space in which first downlink control information is located is higher than that of a search space in which second downlink control information is located.

In this case, the terminal device may first monitor a downlink control channel in the search space with a higher priority, and then monitor a downlink control channel in the search space with a lower priority. Alternatively, the terminal device may first obtain the first downlink control information, and then obtain the second downlink control information.

For example, when the priority of the search space in which the first downlink control information is located is higher than that of the search space in which the second downlink control information is located, in a first possible implementation, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

For example, the second downlink control information may include at least one of the following downlink control information: slot format indication information, discontinuous transmission indication information, or buffer flushing indication information.

For example, when the priority of the search space in which the first downlink control information is located is higher than that of the search space in which the second downlink control information is located, in a second possible implementation, the first downlink control information may be slot format indication information, and the second downlink control information may include at least one of the following downlink control information: discontinuous transmission indication information or buffer flushing indication information.

In this embodiment of this application, optionally, the search space priority may include a search space in which first downlink control information is located has a highest priority. The first downlink control information may be scheduling information of a beam-failure-recovery-request response message.

In this embodiment of this application, optionally, the downlink control information priority may include a priority of first downlink control information is higher than that of second downlink control information.

In this case, the terminal device may first obtain the first downlink control information, and then obtain the second downlink control information.

For example, when the priority of the search space in which the first downlink control information is located is higher than that of the search space in which the second downlink control information is located, in a first possible implementation, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

For example, the second downlink control information may include at least one of the following downlink control information: slot format indication information, discontinuous transmission indication information, or buffer flushing indication information.

For example, when the priority of the first downlink control information is higher than that of the second downlink control information, in a second possible implementation, the first downlink control information may be slot format indication information, and the second downlink control information may include at least one of the following downlink control information: discontinuous transmission indication information or buffer flushing indication information.

In this embodiment of this application, optionally, the downlink control information priority may include first downlink control information has a highest priority. The first downlink control information may be scheduling information of a beam-failure-recovery-request response message.

In this embodiment of this application, optionally, the downlink control information size priority may include a priority of a downlink control information size of first downlink control information is higher than that of a downlink control information size of second downlink control information.

In this case, the terminal device may first monitor a downlink control channel of the downlink control information size with a higher priority, and then monitor a downlink control channel of the downlink control information size with a lower priority. Alternatively, in this case, the terminal device may first obtain the first downlink control information, and then obtain the second downlink control information.

For example, when the priority of the downlink control information size of the first downlink control information is higher than that of the downlink control information size of the second downlink control information, in a first possible implementation, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

For example, the second downlink control information may include at least one of the following downlink control information: slot format indication information, discontinuous transmission indication information, or buffer flushing indication information.

When the priority of the downlink control information size of the first downlink control information is higher than that of the downlink control information size of the second downlink control information, in a second possible implementation, the first downlink control information may be slot format indication information, and the second downlink control information may include at least one of the following downlink control information: discontinuous transmission indication information or buffer flushing indication information.

In this embodiment of this application, optionally, the downlink control information size priority may include a downlink control information size of first downlink control information has a highest priority. The first downlink control information may be scheduling information of a beam-failure-recovery-request response message.

Figure 4:
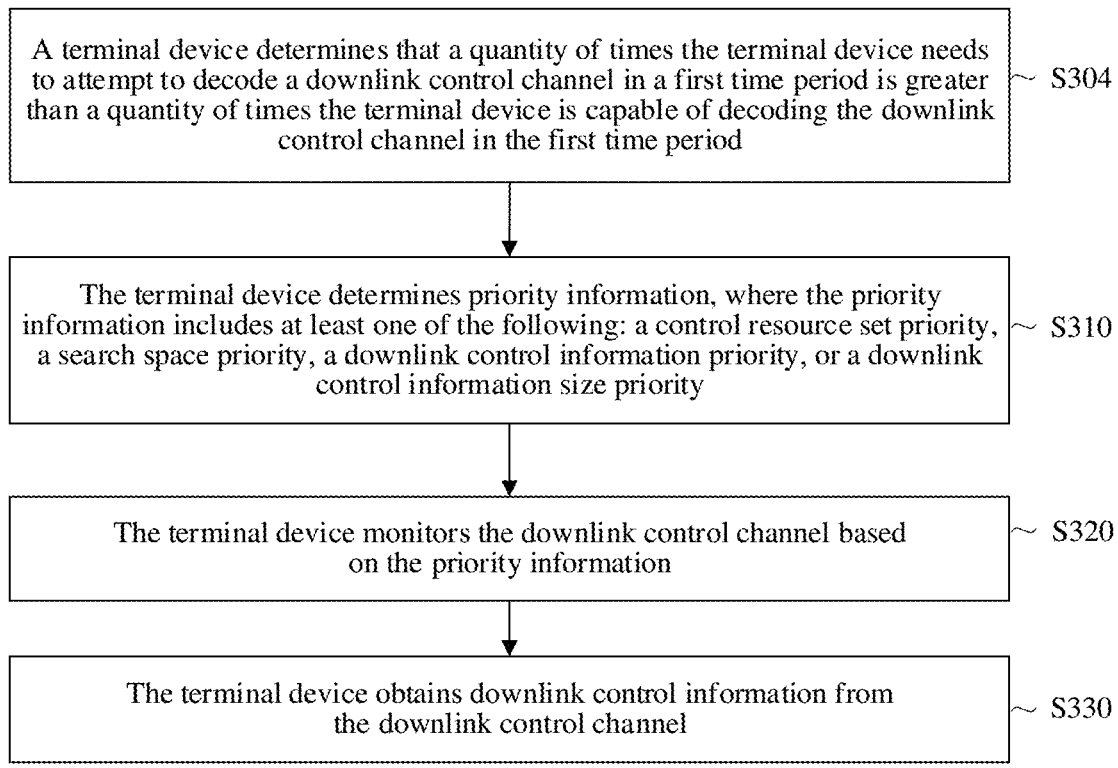
FIG. 4 is a schematic flowchart of a monitoring method according to another embodiment of this application.

In this embodiment of this application, in a possible implementation, as shown in FIG. 4, before S320, the monitoring method may further include S304. The terminal device determines that a quantity of times the terminal device needs to attempt to decode the downlink control channel in a first time period is greater than a quantity of times the terminal device is capable of decoding the downlink control channel in the first time period.

In other words, the terminal device may perform S320 only when determining that the quantity of times the terminal device needs to attempt to decode the downlink control channel in the first time period is greater than the quantity of times the terminal device is capable of decoding the downlink control channel in the first time period.

Figure 5:
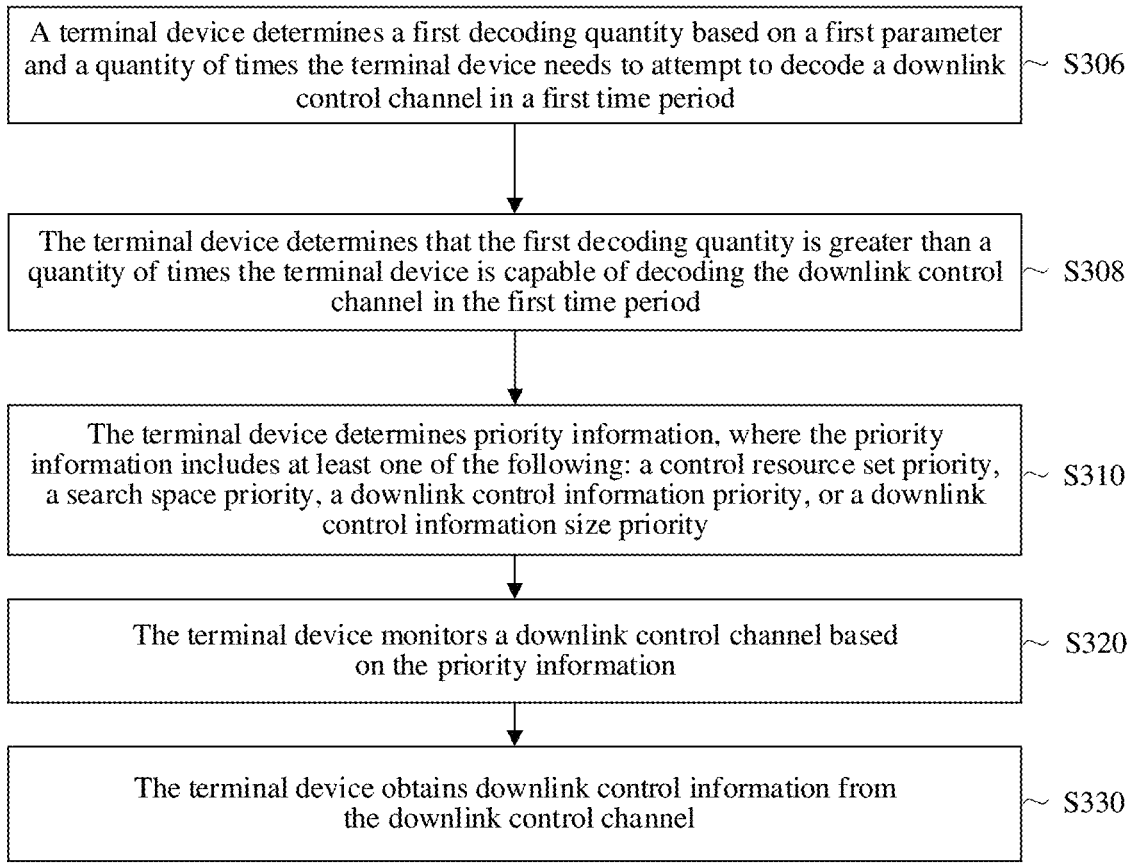
FIG. 5 is a schematic flowchart of a monitoring method according to another embodiment of this application.

In this embodiment of this application, in another possible implementation, as shown in FIG. 5, before S320, the monitoring method may further include S306. The terminal device determines a first decoding quantity based on a first parameter and the quantity of times the terminal device needs to attempt to decode the downlink control channel in the first time period. S308. The terminal device determines that the first decoding quantity is greater than a quantity of times the terminal device is capable of decoding the downlink control channel in the first time period. The first parameter may be configured by a network device or may be predefined.

For example, the first parameter is a reduction factor. In this case, determining, by the terminal device, the first decoding quantity based on the reduction factor and the quantity of times the terminal device needs to attempt to decode the downlink control channel in the first time period may include calculating, by the terminal device, the first decoding quantity $M_p^{(L)}$ according to a formula round $M_p^{(L)}$ =round($a \times M_{p,full}^{(L)}$)).

a is a search space reduction factor configured by the network device, and a value thereof is 0, 0.33, 0.66, 1, or the like. $M_{p,full}^{(L)}$ is configured by the network device for a corresponding control resource set p or is predefined in a standard, and L is an aggregation level of the control resource set p.

In other words, the terminal device may perform S320 only when determining that a reduced quantity of times of attempting to decode the downlink control channel is greater than the quantity of times the terminal device is capable of decoding the downlink control channel in the first time period.

Optionally, the terminal device may perform the monitoring method shown in FIG. 5 only when the terminal device operates in a carrier aggregation (CA) mode, or the terminal device monitors a downlink control channel carrying a carrier indicator field (carrier indicator field, CIF), or the terminal device monitors downlink control channels sent by a plurality of transmission reception points (TRP), or the terminal device simultaneously performs downlink control channel monitoring on a plurality of bandwidth parts (BWP).

In the monitoring method shown in FIG. 4 or FIG. 5, when a quantity of times the terminal device actually decodes the downlink control channel in the first time period is greater than the quantity of times the terminal device is capable of decoding the downlink control channel in the first time period, if the terminal device has not detected a downlink control channel sent by using a control resource set with a lower priority, the terminal device may not monitor the downlink control channel sent by using the control resource set with a lower priority. Alternatively, if the terminal device has not detected a downlink control channel in a search space with a lower priority, the terminal device may not monitor the downlink control channel in the search space with a lower priority. Alternatively, if the terminal device has not detected a downlink control channel in which downlink control information with a lower priority is located, the terminal device may not monitor the downlink control channel in which the downlink control information with a lower priority is located.

In other words, when the quantity of times the terminal device actually decodes the downlink control channel is greater than the quantity of times the terminal device is capable of decoding the downlink control channel in the first time period, the terminal device may preferentially obtain more important downlink control information, without obtaining relatively unimportant downlink control information, so as to implement communication between the terminal device and a network device.

For example, after the terminal device decodes a downlink control channel to obtain scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service, if a quantity of times the terminal device actually decodes the downlink control channel is greater than the quantity of times the terminal device is capable of decoding the downlink control channel, the terminal device may stop monitoring the downlink control channel, that is, may not obtain slot format indication information, discontinuous transmission indication information, or buffer flushing indication information.

For another example, after the terminal device decodes a downlink control channel to obtain slot format indication information, if a quantity of times the terminal device actually decodes the downlink control channel is greater than the quantity of times the terminal device is capable of decoding the downlink control channel, the terminal device may stop monitoring the downlink control channel, that is, may not obtain discontinuous transmission indication information or buffer flushing indication information.

The first time period may be a time period of an absolute time length. For example, the first time period may be one slot or one subframe.

For example, a quantity of times the terminal device is capable of decoding the downlink control channel in one slot may be 44.

The terminal device may determine, based on information such as a cycle of a control resource set configured by the network device, an aggregation level of the control resource set, a candidate quantity of a downlink control channel that needs to be decoded at each aggregation level, and downlink control information that needs to be monitored, a format of the downlink control information, or a size of the downlink control information, a quantity of times the terminal device needs to decode the downlink control channel in the first time period.

Figure 6:
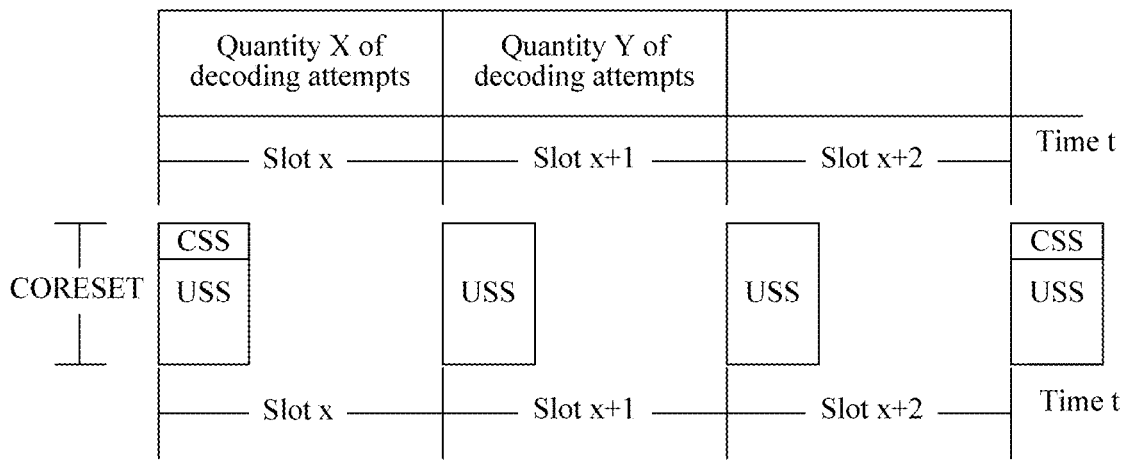
FIG. 6 is a schematic diagram of a search space according to an embodiment of this application.
Figure 7:
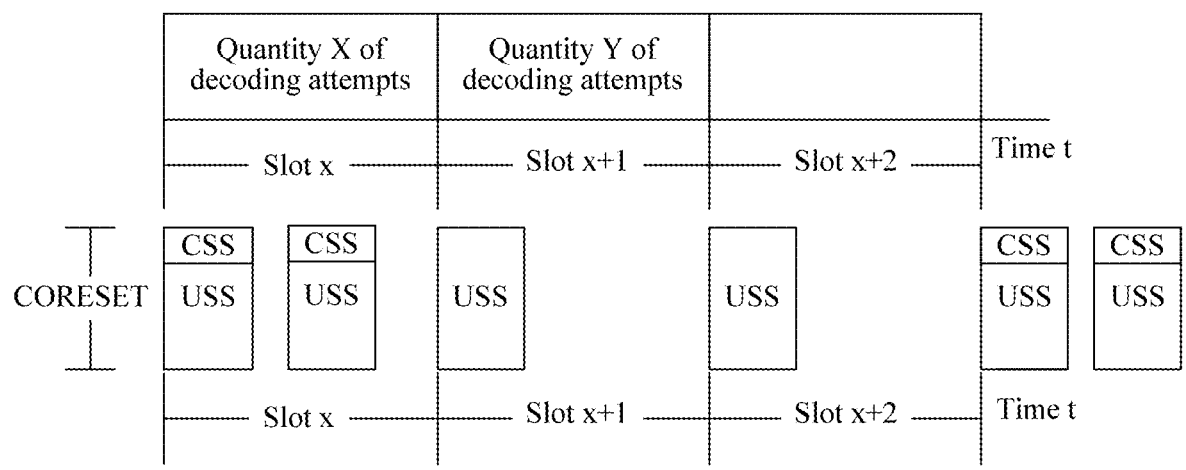
FIG. 7 is a schematic diagram of a search space according to another embodiment of this application.

With reference to FIG. 6 and FIG. 7, the following uses examples to describe a scenario in which a quantity of times a terminal device needs to decode a downlink control channel in a first time period is greater than a quantity of times the terminal device is capable of decoding the downlink control channel in the first time period.

As shown in FIG. 6, a network device configures a control resource set for the terminal device, and a cycle of the control resource set is one slot. The control resource set includes both a common search space and a terminal device-specific search space, and a monitoring cycle of the common search space is different from a monitoring cycle of the terminal device-specific search space.

Specifically, the monitoring cycle of the common search space is three slots, and the monitoring cycle of the terminal device-specific search space is one slot.

Because the monitoring cycle of the common search space is different from the monitoring cycle of the terminal device-specific search space, there are both a common search space and a terminal device-specific search space in some slots. As shown in FIG. 6, there are both a common search space and a terminal device-specific search space in a slot x. There is only a terminal device-specific search space in a slot x+1. Therefore, a quantity X of times of attempting to decode a downlink control channel in the slot x is greater than a quantity Y of times of attempting to decode the downlink control channel in the slot x+1.

Finally, a quantity of times the terminal device needs to decode the downlink control channel in the slot x may be greater than a quantity of times the terminal is capable of decoding the downlink control channel in the slot x.

Assuming that discontinuous transmission indication information is located in a common search space and scheduling information of uplink data or scheduling information of downlink data is located in a terminal device-specific search space, it indicates that a priority of the common search space is lower than that of the terminal device-specific search space. In this case, when a quantity of times the terminal device needs to decode a downlink control channel in the slot x is greater than a quantity of times the terminal is capable of decoding the downlink control channel in the slot x, the terminal device may monitor the downlink control channel in the terminal-specific search space, to obtain scheduling information of uplink data or scheduling information of downlink data. In addition, the terminal device may ignore the common search space, that is, no longer monitor the downlink control channel in the common search space.

As shown in FIG. 7, the network device may configure two control resource sets for the terminal device. Monitoring cycles of the two control resource sets are different. A monitoring cycle of a first control resource set is one slot, and a monitoring cycle of a second control resource set is three slots.

The first control resource set includes both a common search space and a terminal device-specific search space in a slot x, and the first control resource set includes only terminal device-specific search spaces in a slot x+1 and a slot x+2. The second control resource set includes both a common search space and a terminal device-specific search space in the slot x.

Therefore, a quantity X of times of attempting to decode a downlink control channel in the slot x is greater than a quantity Y of times of attempting to decode the downlink control channel in the slot x+1.

It can be learnt from FIG. 7 that, both control resource sets include both a common search space and a terminal device-specific search space in the slot x, so that a quantity of times the terminal device needs to decode a downlink control channel in the slot x may be greater than a quantity of times the terminal device is capable of decoding the downlink control channel.

If the first control resource set is used to carry scheduling information of uplink data or scheduling information of downlink data, and the second control resource set is used to carry discontinuous transmission indication information, the terminal device may first monitor a downlink control channel in the first control resource set, and then monitor a downlink control channel in the second control resource set.

When a quantity of times the terminal device needs to decode a downlink control channel in the slot x may be greater than a quantity of times the terminal device is capable of decoding the downlink control channel, the terminal device may ignore the downlink control channel in the second control resource set.

It should be noted that, different downlink control information formats may carry a same quantity of bits, or may carry different quantities of bits.

If different downlink control information formats mapped to a same search space carry a same quantity of bits, a quantity of times user equipment attempts to decode a downlink control channel in the search space is not affected.

For example, if a downlink control information format X and a downlink control information format Y carry a same quantity of bits, a terminal device 1 monitors only the downlink control information format X, a terminal device 2 monitors only the downlink control information format Y, and a terminal device 3 monitors both the downlink control information format X and the downlink control information format Y. In this case, quantities of times the three terminal devices attempt to decode a downlink control channel in a same search space are the same.

If different downlink control information formats carry different quantities of information bits (where each bit carries information), to avoid an increase in quantities of times terminal devices attempt to decode a downlink control channel in a same search space, a bit '0' may be padded in a downlink control information format that carries a smaller quantity of information bits, so that quantities of bits (including the padding bit) carried in the two downlink control information formats after padding are the same. It should be noted that the padding bit carries no information.

When quantities of bits carried in different downlink control information formats are the same, information bits may be used in the downlink control information formats to distinguish between the downlink control information formats, so as to distinguish between downlink control information.

Figure 8:
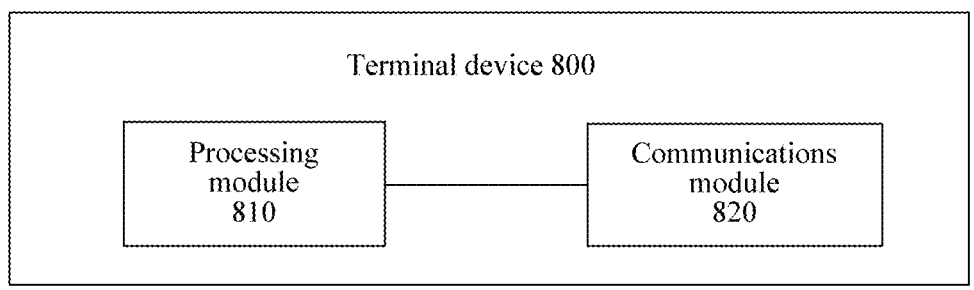
FIG. 8 is a schematic structural diagram of a monitoring apparatus according to an embodiment of this application.

FIG. 8 is a schematic structural diagram of an apparatus for monitoring a downlink control channel according to an embodiment of this application. It should be understood that the monitoring apparatus 800 shown in FIG. 8 is merely an example. The monitoring apparatus in this embodiment of this application may further include other modules or units, or include modules having functions similar to those of the modules in FIG. 8, or does not need to include all modules in FIG. 8.

The monitoring apparatus 800 shown in FIG. 8 may include a processing module 810 and a communications module 820.

The monitoring apparatus 800 may be configured to perform the steps performed by the terminal device in the monitoring method shown in any one of FIG. 3 to FIG. 5.

For example, the monitoring apparatus 800 may be configured to perform the steps or operations performed by the terminal device in the monitoring method shown in FIG. 3.

The processing module 8100 may be configured to determine priority information, where the priority information includes at least one of the following: a control resource set priority, a search space priority, a downlink control information priority, or a downlink control information size priority.

The communications module 820 may be configured to monitor a downlink control channel based on the priority information.

The processing module 810 may be further configured to obtain downlink control information from the downlink control channel.

For example, the monitoring apparatus 800 may be further configured to perform the steps or operations performed by the terminal device in the monitoring method shown in FIG. 4.

The processing module may be further configured to determine that a quantity of times the terminal device needs to attempt to decode the downlink control channel in a first time period is greater than a quantity of times the terminal device is capable of decoding the downlink control channel in the first time period.

For example, the monitoring apparatus 800 may be further configured to perform the steps or operations performed by the terminal device in the monitoring method shown in FIG. 5.

The processing module may be further configured to determine a first decoding quantity based on a first parameter and the quantity of times the terminal device needs to attempt to decode the downlink control channel in the first time period, where the first parameter is configured by a network device or is predefined, and determine that the first decoding quantity is greater than a quantity of times the terminal device is capable of decoding the downlink control channel in the first time period.

Optionally, the terminal device monitors a downlink control channel carrying a carrier indicator field, the terminal device monitors a downlink control channel carrying a bandwidth part BWP indicator field, and/or the terminal device monitors downlink control channels sent by a plurality of transmission reception points.

Optionally, the control resource set priority may include a priority of a control resource set carrying first downlink control information is higher than that of a control resource set carrying second downlink control information.

Correspondingly, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

The second downlink control information may include at least one of the following downlink control information: slot format indication information, discontinuous transmission indication information, or buffer flushing indication information.

Optionally, the control resource set priority may include a priority of a control resource set carrying first downlink control information is higher than that of a control resource set carrying second downlink control information.

Correspondingly, the first downlink control information may be slot format indication information.

The second downlink control information may include at least one of the following downlink control information: discontinuous transmission indication information or buffer flushing indication information.

Optionally, the control resource set priority may include a control resource set carrying first downlink control information has a highest priority.

Correspondingly, the first downlink control information may be scheduling information of a beam-failure-recovery-request response message.

Optionally, the priority of the search space may include a priority of a search space in which first downlink control information is located is higher than that of a search space in which second downlink control information is located.

Correspondingly, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

The second downlink control information may include at least one of the following downlink control information: slot format indication information, discontinuous transmission indication information, or buffer flushing indication information.

Optionally, the search space priority may include a priority of a search space in which first downlink control information is located is higher than that of a search space in which second downlink control information is located.

Correspondingly, the first downlink control information may be slot format indication information.

The second downlink control information may include at least one of the following downlink control information: discontinuous transmission indication information or buffer flushing indication information.

Optionally, the search space priority may include a search space in which first downlink control information is located has a highest priority.

Correspondingly, the first downlink control information may be scheduling information of a beam-failure-recovery-request response message.

Optionally, the priority of the downlink control information may include a priority of the first downlink control information is higher than a priority of second downlink control information.

Correspondingly, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

The second downlink control information may include at least one of the following downlink control information: slot format indication information, discontinuous transmission indication information, or buffer flushing indication information.

Optionally, the priority of the downlink control information may include a priority of first downlink control information is higher than a priority of second downlink control information.

Correspondingly, the first downlink control information may be slot format indication information.

The second downlink control information includes at least one of the following downlink control information: discontinuous transmission indication information or buffer flushing indication information.

Optionally, the priority of the downlink control information may include first downlink control information has a highest priority.

Correspondingly, the first downlink control information may be scheduling information of a beam-failure-recovery-request response message.

Optionally, the downlink control information size priority may include a priority of a downlink control information size of first downlink control information is higher than that of a downlink control information size of second downlink control information.

Correspondingly, the first downlink control information may include at least one of the following downlink control information: scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service.

The second downlink control information may include at least one of the following downlink control information: slot format indication information, discontinuous transmission indication information, or buffer flushing indication information.

Optionally, the downlink control information size priority may include a priority of a downlink control information size of first downlink control information is higher than that of a downlink control information size of second downlink control information.

Correspondingly, the first downlink control information may be slot format indication information.

The second downlink control information may include at least one of the following downlink control information: discontinuous transmission indication information or buffer flushing indication information.

Optionally, the downlink control information size priority may include a downlink control information size of first downlink control information has a highest priority.

Correspondingly, the first downlink control information may be scheduling information of a beam-failure-recovery-request response message.

Figure 9:
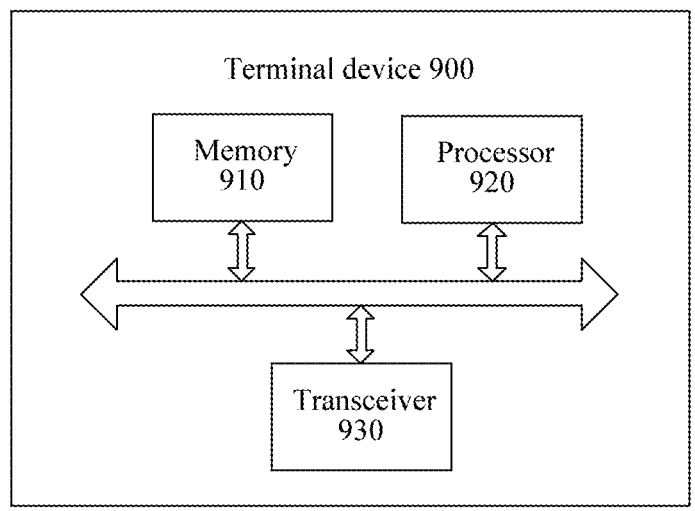
FIG. 9 is a schematic structural diagram of a monitoring apparatus according to another embodiment of this application.

FIG. 9 is a schematic structural diagram of a monitoring apparatus according to another embodiment of this application. It should be understood that the monitoring apparatus 900 shown in FIG. 9 is merely an example. The monitoring apparatus in this embodiment of this application may further include other modules or units, or include modules having functions similar to those of the modules in FIG. 9, or does not need to include all modules in FIG. 9.

The monitoring apparatus 900 shown in FIG. 9 may include a processor 920 and a transceiver 930.

The monitoring apparatus 900 may be configured to perform the steps performed by the terminal device in the monitoring method shown in any one of FIG. 3 to FIG. 5.

Specifically, the processor 920 may be configured to implement the operations or steps performed by the processing module 810 in FIG. 8, and the transceiver 930 may be configured to implement the operations or steps performed by the communications module 820 in FIG. 8.

Optionally, the monitoring apparatus 900 may further include a memory 910. The memory 910 is configured for the processor to store program code and related data. The memory 910 may be integrated into the processor 920.

Figure 10:
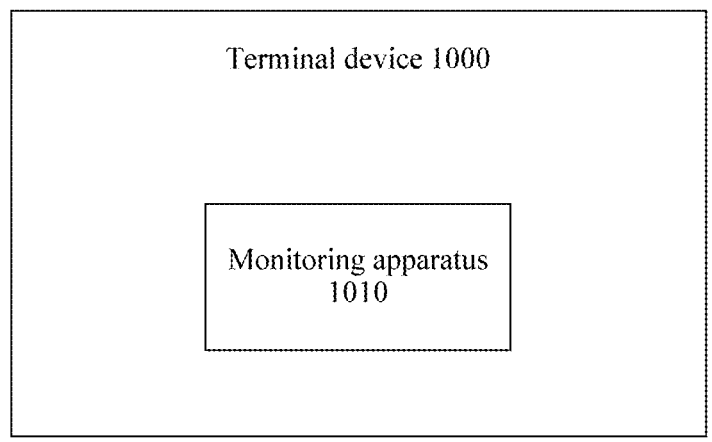
FIG. 10 is a schematic structural diagram of a terminal device according to an embodiment of this application.

FIG. 10 is a schematic structural diagram of a terminal device according to an embodiment of this application, It should be understood that the terminal device 1000 shown in FIG. 10 is merely an example. The terminal device in this embodiment of this application may further include other modules or units, or include modules having functions similar to those of the modules in FIG. 10.

The terminal device 1000 may include a monitoring apparatus 1010. The monitoring apparatus 1010 may be the monitoring apparatus 800 in FIG. 8, or may be the monitoring apparatus 900 in FIG. 9.

In other words, the terminal device 1000 may perform the steps or operations performed by the terminal device in the monitoring method in any one of FIG. 3 to FIG. 5.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for monitoring a downlink control channel, comprising:
   determining, by a terminal device, priority information in response to a quantity of times that the terminal device needs to attempt to decode the downlink control channel in a first time period being greater than a quantity of times the terminal device is capable of decoding the downlink control channel in the first time period, wherein the priority information is stored on the terminal and is one of configured based on configuration information sent by a network device or preconfigured by the terminal device according to at least one of a communications protocol or a communications standard, and wherein the priority information comprises at least one of a control resource set priority, a search space priority, a downlink control information priority, or a downlink control information size priority;
   monitoring, by the terminal device, in response to the quantity of times that the terminal device needs to attempt to decode the downlink control channel in the first time period being greater than the quantity of times the terminal device is capable of decoding the downlink control channel in the first time period, a downlink control channel selected from a plurality of downlink control channels according to the priority information, wherein at least two downlink control channels, including the downlink control channel, of the plurality of downlink control channels are monitored in a sequential order determined according to the priority information; and
   obtaining, by the terminal device, downlink control information from the downlink control channel.

2. The monitoring method according to claim 1, further comprising performing, before the monitoring the downlink control channel:
   determining, by the terminal device, a first decoding quantity based on a first parameter and a quantity of times the terminal device needs to attempt to decode the downlink control channel in a first time period, wherein the first parameter is a search space reduction factor; and
   determining, by the terminal device, that the first decoding quantity is greater than the quantity of times the terminal device is capable of decoding the downlink control channel in the first time period.

3. The monitoring method according claim 1, wherein the priority of the control resource set comprises a priority of a control resource set carrying first downlink control information that is higher than a priority of a control resource set carrying second downlink control information;
   wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and wherein the second downlink control information comprises at least one of slot format indication information, discontinuous transmission indication information, or buffer flushing indication information.

4. The monitoring method according to claim 1, wherein the control resource set priority comprises a priority of a control resource set carrying first downlink control information that is higher than a priority of a control resource set carrying second downlink control information;
 wherein the first downlink control information is slot format indication information; and
 wherein the second downlink control information comprises at least one of discontinuous transmission indication information or buffer flushing indication information.

5. The monitoring method according to claim 1, wherein the control resource set priority comprises a control resource set carrying first downlink control information having a highest priority;
 wherein the first downlink control information is scheduling information of a beam-failure-recovery-request response message.

6. The monitoring method according to claim 1, wherein the search space priority comprises a priority of a search space in which first downlink control information is located that is higher than a priority of a search space in which second downlink control information is located;
 wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and
 wherein the second downlink control information comprises at least one of slot format indication information, discontinuous transmission indication information, or buffer flushing indication information.

7. The monitoring method according to claim 1 wherein the search space priority comprises a priority of a search space in which first downlink control information is located that is higher than a priority of a search space in which second downlink control information is located;
 wherein the first downlink control information is slot format indication information, and
 wherein the second downlink control information comprises at least one discontinuous transmission indication information or buffer flushing indication information.

8. The monitoring method according to claim 1, wherein the priority of the search space indicated a search space in which first downlink control information is located having a highest priority; and
 wherein the first downlink control information is scheduling information of a beam-failure-recovery-request response message.

9. The monitoring method according to claim 1, wherein the priority of the downlink control information comprises a priority of first downlink control information that is higher than a priority of second downlink control information;
 wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and
 wherein the second downlink control information comprises at least one of slot format indication information, discontinuous transmission indication information, or buffer flushing indication information.

10. A downlink control channel monitoring apparatus, comprising:
 a transceiver;
 a processor; and
 a non-transitory computer readable medium storing a program for execution by the processor, the program including instructions to:
  determine priority information in response to a quantity of times that the apparatus needs to attempt to decode the downlink control channel in a first time period being greater than a quantity of times the apparatus is capable of decoding the downlink control channel in the first time period, wherein the priority information is stored on the apparatus and is one of configured based on configuration information sent by a network device or preconfigured by the apparatus according to at least one of a communications protocol or a communications standard, and wherein the priority information comprises at least one of a control resource set priority, a search space priority, a downlink control information priority, or a downlink control information size priority;
  cause, in response to the quantity of times that the apparatus needs to attempt to decode the downlink control channel in the first time period being greater than the quantity of times the apparatus is capable of decoding the downlink control channel in the first time period, the transceiver to monitor a downlink control channel selected from a plurality of downlink control channels according to the priority information, wherein at least two downlink control channels, including the downlink control channel, of the plurality of downlink control channels are monitored in a sequential order determined according to the priority information; and
  obtain downlink control information from the downlink control channel monitored by the transceiver.

11. The monitoring apparatus according to claim 10, wherein program further includes instructions to perform, before the instructions to cause the transceiver to monitor the downlink control channel:
 determine a first decoding quantity according to a first parameter and a quantity of times the monitoring apparatus needs to attempt to decode the downlink control channel in a first time period, wherein the first parameter is a search space reduction factor; and
 wherein that the first decoding quantity is greater than a quantity of times the monitoring apparatus is capable of decoding the downlink control channel in the first time period.

12. The monitoring apparatus according to claim 10, wherein the priority of the control resource set comprises a priority of a control resource set carrying first downlink control information that is higher than a priority of a control resource set carrying second downlink control information;
  wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and
  wherein the second downlink control information comprises at least one of slot format indication information, discontinuous transmission indication information, or buffer flushing indication information.

13. The monitoring apparatus according to claim 10, wherein the control resource set priority comprises a priority of a control resource set carrying first downlink control information that is higher than a priority of a control resource set carrying second downlink control information;
  wherein the first downlink control information is slot format indication information; and
  wherein the second downlink control information comprises at least one of discontinuous transmission indication information or buffer flushing indication information.

14. The monitoring apparatus according to claim 10, wherein the control resource set priority comprises a control resource set carrying first downlink control information having a highest priority;
  wherein the first downlink control information is scheduling information of a beam-failure-recovery-request response message.

15. The monitoring apparatus according to claim 10, wherein the search space priority comprises a priority of a search space in which first downlink control information is located that is higher than a priority of a search space in which second downlink control information is located;
  wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and
  wherein the second downlink control information comprises at least one of slot format indication information, discontinuous transmission indication information, or buffer flushing indication information.

16. The monitoring apparatus according to claim 10, wherein the search space priority comprises a priority of a search space in which first downlink control information is located that is higher than a priority of a search space in which second downlink control information is located;
  wherein the first downlink control information is slot format indication information, and
  wherein the second downlink control information comprises at least one of discontinuous transmission indication information or buffer flushing indication information.

17. The monitoring apparatus according to claim 10, wherein the priority of the search space comprises a search space in which first downlink control information is located having a highest priority;
  wherein the first downlink control information is scheduling information of a beam-failure-recovery-request response message.

18. The monitoring apparatus according to claim 10, wherein the priority of the downlink control information comprises a priority of first downlink control information that is higher than that of second downlink control information;
  wherein the first downlink control information comprises at least one of scheduling information of system information, scheduling information of a random access response message, scheduling information of uplink data, scheduling information of downlink data, a transmit power control command of a physical uplink shared channel, a transmit power control command of a physical uplink control channel, a transmit power control command of a sounding reference signal, scheduling information of a semi-persistent scheduling service, or scheduling information of a grant-free service; and
  wherein the second downlink control information comprises at least one of slot format indication information, discontinuous transmission indication information, or buffer flushing indication information.

* * * * *